United States Patent Office 3,317,740
Patented May 2, 1967

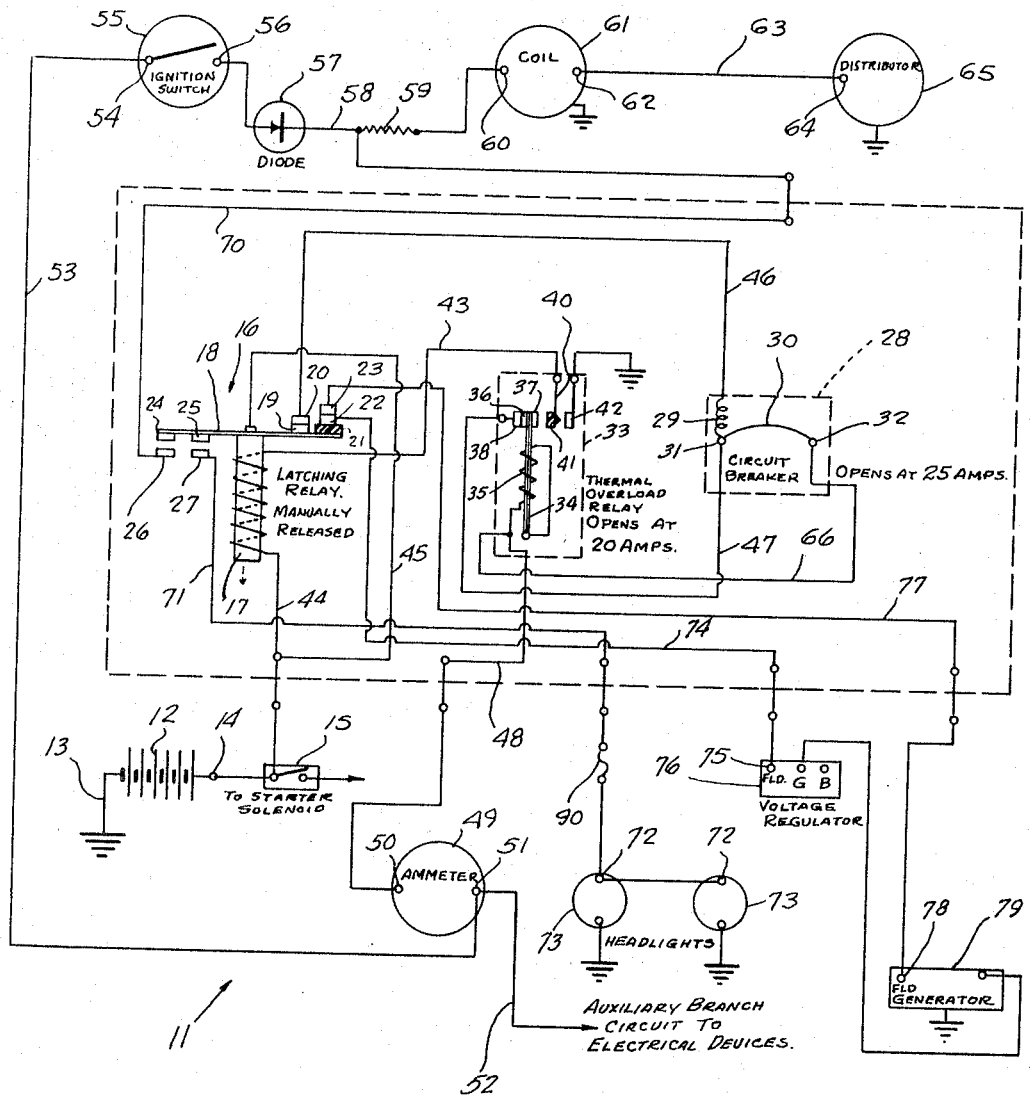

3,317,740
ELECTRICAL FIRE GUARD
Stanley Saj, P.O. Box 222, 820 Brunner St., and Donald O. Burns, 1822 Rock St., both of Peru, Ill. 61354
Filed May 28, 1964, Ser. No. 370,880
7 Claims. (Cl. 307—39)

This invention relates to protective devices for motor vehicles, and more particularly to a safety circuit for use in a motor vehicle to automatically disconnect defective circuits from the motor vehicle battery while at the same time allowing the vehicle headlights and ignition circuit to remain energized.

A main object of the invention is to provide a novel and improved motor vehicle safety circuit which is relatively simple in construction, which involves inexpensive parts, which is easy to install, and which is arranged to automatically disconnect grounded circuits from the battery of the motor vehicle while at the same time providing energization of the vehicle headlights and of the ignition circuit, whereby the occurrence of short or grounds in the motor vehicle circuitry when occurring during the operation of the vehicle, for example, at night, will allow the vehicle to continue in operation for a sufficient length of time to enable the vehicle to be driven to a service station or garage for repairs.

A further object of the invention is to provide an improved safety circuit for a motor vehicle which automatically disconnects defective circuits from the vehicle battery while permitting limited operation of the other essential vehicle circuits, whereby when short circuits occur in portions of the electrical circuitry of the vehicle, the vehicle will not be totally disabled but will be able to continue operation for at least a sufficient period of time to reach a service station or to reach some other location where repairs can be conveniently made.

A still further object of the invention is to provide an improved overload-responsive safety circuit for a motor vehicle which responds to overload current in a manner to disconnect defective circuits from the vehicle battery and to maintain said defective circuits disconnected until they have been repaired, while allowing energization of the essential vehicle circuits, such as the ignition circuit and the headlights, to permit temporary continued operation of the vehicle, the safety circuit involving a minimum number of parts, being reliable in operation, and greatly reducing fire hazards from short circuits in a vehicle electrical circuit.

Further objects and advantages will become apparent from the following description and claims, and from the accompanying drawing, wherein the single figure represents the wiring diagram of a motor vehicle employing a safety circuit constructed in accordance with the present invention.

Referring to the drawing, 11 generally designates the schematic diagram of a typical vehicle electrical circuit employing the present invention. The circuit 11 comprises the conventional vehicle battery 12 which has one terminal thereof grounded, as shown at 13, and which has the ungrounded terminal 14. The terminal 14 is connected through a conventional starter switch 15 to the vehicle starter solenoid, which is arranged in a conventional manner to energize the starting motor of the vehicle when the switch 15 is closed. Designated generally at 16 is a latching relay of the type which remains latched, subsequent an energization of its operating coil 17, until manually released. In the normal denergized condition of the relay 16, its armature, shown at 18, is in an elevated position. The armature 18, which is of conductive material, is provided with a contact 19 which normally engages an adjacent stationary contact 20. Armature 17 is further provided with an insulating block 21 carrying a contact element 22 which normally engages an adjacent opposing stationary contact element 23. In the latched condition of the relay, following energization of its winding 17, contact 19 is disengaged from contact 20 and contact 22 is disengaged from contact 23.

Armature 18 is provided with a pair of depending contact elements 24 and 25 which are movable into engagement with opposing stationary contact elements, shown respectively at 26 and 27 and to be held in engagement therewith responsive to the energization and latching of the relay. Normally, said contacts 24 and 25 are disengaged from the subjacent stationary contact elements 26 and 27, as shown in the drawing.

The circuit 11 is provided with a conventional circuit breaker, shown schematically at 28, which includes an operating coil 29 and a switch bar 30 which normally engages and conductively bridges a pair of terminals 31 and 32 but which disconnects said terminals responsive to a predetermined value of overload current in the coil 29, for example, a current of 25 amperes or more.

Designated at 33 is a thermal overload relay having a temperature-sensitive armature, for example, a bimetal armature 34 and a heater winding 35. The bimetal armature 34 is provided with opposing contact elements 36 and 37, the contact element 36 normally engaging a stationary contact 38 but being flexed away from such engagement when a predetermined value of overload current is received by the thermal relay winding 35, for example, an overload current of twenty amperes or more, namely, an overload current which is substantially less than the overload current required to operate the circuit breaker 28. The themal relay 33 also includes a flexible contact arm 40 carrying an insulating block 41 engageable by the element 37 on the bimetal armature 34, whereby the contact arm 40 is moved into engagement with an adjacent stationary contact arm 42 when the bimetal member 34 flexes in response to the aforesaid overload current.

The contact 42 is grounded, as shown. Contact arm 42 is connected by a wire 43 to one terminal of the relay winding 17. The other terminal of the relay winding is connected by a wire 44 to the ungrounded battery terminal 14. Thus, when the thermal overload relay 33 operates to move contact member 40 into engagement with the stationary contact 42, relay winding 17 becomes energized by a circuit comprising battery terminal 14, wire 44, the winding 17 of relay 16, wire 43, contact arm 40, contact 42 and ground.

As shown, armature 18 is connected to battery wire 44 by a wire 45. Contact element 20 is connected by a wire 46 to one terminal of the coil 29 of circuit breaker 28, the other terminal thereof being connected to the circuit breaker terminal 31 which is connected in turn by a wire 47 to the stationary thermal relay contact 38. The thermal relay winding 35 has one terminal thereof connected to the bimetal arm 34 and the other terminal thereof connected by a wire 48 to one terminal 50 of the vehicle ammeter 49. The other terminal 51 of the ammeter is connected by a wire 52 to the various vehicle electrical circuits such as the various lamps of the vehicle and various other conventional appliances and electrical equipment normally provided therein. Terminal 51 is further connected by a wire 53 to one terminal 54 of the vehicle ignition switch 55, the other terminal 56 of said ignition switch being connected through a diode 57 to a wire 58. Wire 58 is connected through a current limiting resistor 59 to the low tension terminal 60 of the vehicle ignition coil 61. The high tension terminal 62 of the coil 61 is connected in a conventional manner by a wire 63 to the high tension terminal 64 of the vehicle distributor 65.

It will be noted that current can flow through the diode 57 in one direction only, namely, in a direction to energize the ignition coil 61 when the ammeter terminal 51 is substantially at the potential and polarity of the ungrounded battery terminal 14. Should this potential and polarity be assumed by the wire 58, substantially no current will flow back through the diode 57 to the terminal 51.

The circuit breaker terminal 32 is connected by a wire 66 to the wire 48, so that normally the thermal overload-responsive winding 35 is short circuited by the jumper element 30 of the circuit breaker 28. This prevents operation of the thermal overload relay 33 unless the circuit breaker 28 is operated, namely, unless the overload current sensed by the circuit breaker coil 29 exceeds a predetermined maximum value, for example, twenty-five amperes.

The stationary contact 26 is connected by a wire 70 to the wire 58 and the stationary contact 27 is connected by a wire 71 to the ungrounded terminals 72, 72 of the vehicle headlights 73, 73.

The relay contact 22 is connected by a wire 74 to the "field" terminal 75 of the conventional vehicle voltage regulator unit 76. The relay contact 23 is connected by a wire 77 to the ungrounded "field" terminal 78 of the conventional vehicle generator 79. Normally, relay contact 22 engages stationary relay contact 23, whereby the field winding of the generator 79 is energized in the conventional manner from the "field" terminal 75 of the voltage regulator 76 through the wire 74, the contacts 22 and 23, the wire 77 and the generator field terminal 78.

It will be seen that under normal conditions the ungrounded battery wire 44 is connected to the terminal 51 of the ammeter 49, and hence to the normal vehicle electrical circuits through wire 44, wire 45, armature 18, contacts 19 and 20, wire 46, circuit breaker coil 29, circuit breaker terminal 31, wire 47, jumper element 30, terminal 32, wire 66, wire 48, ammeter terminal 50 and the current coil of ammeter 49. Also, under said normal conditions, the field winding of the generator is energized through the contacts 22 and 23 and the circuit above described.

When a short circuit occurs in any wire or other element connected to the wire 52, causing excessive overload current, for example a current of more than forty-five amperes to flow through the ammeter 49 and through the circuit breaker coil 29, the circuit breaker 28 is actuated, causing the jumper member 30 to disconnect contacts 31 and 32. This causes the heater winding 35 of the thermal overload relay 33 to be energized through a circuit comprising the ungrounded battery terminal 14, wire 44, wire 45, armature 18, contacts 19 and 20, wire 46, series coil 29 of the circuit breaker, wire 47, contacts 38 and 36, bimetal arm 34, heater winding 35, wire 48, ammeter 49, and the grounded wire 52. Under the effects of the overload current in the heater winding 35, the bimetal member 34 flexes so that the contacts 36 and 38 open and element 37 flexes contact arm 40 into conductive engagement with stationary contact 42. This energizes the relay winding 17 through a circuit comprising ungrounded battery terminal 14, wire 44, the winding 17, the wire 43, the contacts 40 and 42, and ground, as above described. Armature 18 is moved downwardly so that contacts 19 and 20 open and contacts 22 and 23 likewise open. Contact 24 engages contact 26 and contact 25 engages contact 27. This connects the ungrounded battery terminal 14 to the ignition wire 58 through a circuit comprising wire 44, wire 45, armature 18, contacts 24 and 26, and wire 70, energizing the ignition circuit of the vehicle to maintain its engine in operation. At the same time, the headlights 73, 73 are energized by a circuit comprising battery terminal 14, wire 44, wire 45, armature 18, contacts 25 and 27, wire 71, and the terminals 72, 72 of the headlights 73, 73. Therefore, the headlights 73, 73 as well as the ignition circuit of the vehicle are held energized, permitting continued operation of the vehicle so that it can be driven to a service station or to some other location convenient for repairing the vehicle. Under these conditions, the short circuited conductor 52 is completely disconnected from the battery 12, and similarly, the field winding of the generator 79 is likewise disconnected from the battery 12, so that no damage to the generator will occur, and also so that there will be no fire hazard because of the short circuit associated with supply wire 52. Although the bimetal arm 34, after cooling, will return contact 36 into engagement with contact 38, to restore the normal connection of arm 34 to wire 47, the heater winding 35 can no longer be energized since the relay 16 is latched and remains so until manually released. If the short circuit continues after the relay 16 is manually released, the above described operation will be repeated, causing the normal electrical circuits to be opened at the contacts 19, 20 and 22, 23 of relay 16.

It will be noted that the diode 57 acts as an open circuit relative to the load wire 52 when said load wire contains a short circuit or a partial ground sufficient to cause operation of the above described safety circuit, namely, to cause the relay 16 to be operated.

The wire 71 leading to the headlight terminals 72, 72 may be provided with a separate fuse 90 which will open the headlight circuit in the event that either of the headlights is short circuited or if the terminals 72 become grounded.

As will be readily apparent, if a short circuit occurs in any of the devices connected to the load wire 52 while the vehicle is operating, the relay 16 will become energized in the manner above described, namely, following the operation of circuit breaker 28 and thermal overload relay 33, whereby the ignition circuit of the vehicle will be energized through the wire 70 and the headlights 73, 73 will be energized through the wire 71, allowing the vehicle to continue operation but disconnecting the circuits associated with the load wire 52 and also disconnecting the field circuit of the generator 79 from the vehicle battery, so that the generator is rendered inoperative.

If a short circuit occurs in one of the devices or branch circuits connected to the load wire 52 while the vehicle is not operating, the safety circuit will function in the manner above described to energize the headlights 73, 73, thus providing an indication of the short circuit in the system connected to wire 52.

It will be noted that due to the heating time required for the heater winding 35 to cause flexure of the bimetal arm 34, momentary short circuit in the auxiliary branch circuit connected to wire 52 will not cause unnecessary operation of the relay 16.

While a specific embodiment of an improved safety electrical circuit for a motor vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle electrical circuit of the type including a battery, a headlight branch circuit, an ignition branch circuit and an auxiliary branch circuit, means normally connectng said headlight branch circuit, ignition branch circuit and auxiliary branch circuit to said battery and including a diode connecting said ignition branch circuit in parallel with said auxiliary branch circuit, means operating in response to a sustained overload current in said auxiliary branch circuit to disconnect the auxiliary branch circuit from the battery and to connect the ignition branch circuit and headlight branch circuit in parallel to the battery, said diode being polarized to prevent flow of current from the ignition branch circuit to the auxiliary branch circuit.

2. In a motor vehicle electrical circuit of the type including a battery, a headlight branch circuit, an ignition branch circuit, and an auxiliary branch circuit, a relay, normally closed contact means on the relay normally connecting said auxiliary branch circuit to the battery, conductor means including a diode connecting said ignition branch circuit in parallel with said auxiliary branch circuit, means to energize said relay responsive to overload current in said auxiliary branch circuit, whereby to open said contact means, and means connecting said ignition branch circuit and headlight branch circuit in parallel to said battery responsive to energization of the relay, said diode being polarized to prevent flow of current from the battery to the auxiliary branch circuit when the relay is energized.

3. In a motor vehicle electrical circuit of the type including a battery, a headlight branch circuit, an ignition branch circuit, and an auxiliary branch circuit, a relay, normally closed contact means on the relay normally connecting said auxiliary branch circuit to the battery, conductor means including a diode connecting said ignition branch circuit in parallel with said auxiliary branch circuit, a thermally operated switch having a heater winding connected in circuit with said auxiliary branch circuit and having normally open contacts connected in circuit with the relay and the battery to energize said relay responsive to overload current in said auxiliary branch circuit, whereby to open said contact means, and means connecting said ignition branch circuit and headlight branch circuit in parallel to said battery responsive to energization of the relay, said diode being polarized to prevent flow of current from the battery to the auxiliary branch circuit when the relay is energized.

4. In a motor vehicle electrical circuit of the type including a battery, a headlight branch circuit, an ignition branch circuit, and an auxiliary branch circuit, a manually releasable latching relay, circuit means including normally closed contact elements on the relay normally connecting said auxiliary branch circuit to the battery, conductor means including a diode connecting said ignition branch circuit in parallel with said auxiliary branch circuit, a thermally operated switch having a heater winding connected in circuit with said auxiliary branch circuit and having normally open contacts connected in circuit with the relay and the battery to energize said relay responsive to overload current in said auxiliary branch circuit, whereby to open said contact elements, and means connecting said ignition branch circuit and headlight branch circuit in parallel to said battery responsive to energization of the relay, said diode being polarized to prevent flow of current from the battery to the auxiliary branch circuit when the relay is energized.

5. In a motor vehicle electrical circuit of the type including a battery, a headlight branch circuit, an ignition branch circuit, and an auxiliary branch circuit, a manually releasable latching relay, circuit means including normally closed contact elements on the relay normally connecting said auxiliary branch circuit to the battery, conductor means including a diode connecting said ignition branch circuit in parallel with said auxiliary branch circuit, a thermally operated switch having a heater winding connected in circuit with said auxiliary branch circuit and having normally open contacts connected in circuit with the relay and the battery, a circuit breaker having an operating coil connected in circuit with said auxiliary branch circuit and having a jumper element, means normally connecting said jumper element across said heater winding, whereby to energize said relay responsive to overload current in said auxiliary branch circuit and to open said contact elements, and means connecting said ignition branch circuit and headlight branch circuit in parallel to said battery responsive to energization of the relay, said diode being polarized to prevent flow of current from the battery to the auxiliary branch circuit when the relay is energized.

6. In a motor vehicle electrical circuit of the type including a battery, a headlight branch circuit, an ignition branch circuit, a generator including a field branch circuit, and au auxiliary branch circuit, a manually releasable latching relay, normally closed contact means on the relay, circuit means including said normally closed contact means connecting said auxiliary branch circuit and field branch circuit to the battery, conductor means including a diode connecting said ignition branch circuit in parallel with said auxiliary branch circuit, a thermally operated switch having a heater winding connected in circuit with said auxiliary branch circuit and having normally open contacts connected in circuit with the relay and the battery to energize said relay responsive to overload current in said auxiliary branch circuit, whereby to open said contact means, and means connecting said ignition branch circuit and headlight branch circuit in parallel to said battery responsive to energization of the relay, said diode being polarized to prevent flow of current from the battery to the auxiliary branch circuit when the relay is energized.

7. In a motor vehicle electrical circuit of the type including a battery, a headlight branch circuit, an ignition branch circuit, a generator including a field branch circuit, and an auxiliary branch circuit, a manually releasable latching relay, normally closed contact means on the relay, circuit means including said normally closed contact means connecting said auxiliary branch circuit and field branch circuit to the battery, conductor means including a diode connecting said ignition branch circuit in parallel with said auxiliary branch circuit, a thermally operated switch having a heater winding connected in circuit with said auxiliary branch circuit and having normally open contacts connected in circuit with the relay and the battery, a circuit breaker having an operating coil connected in circuit with said auxiliary branch circuit and having a jumper element, means normally connecting said jumper element across said heater winding, whereby to energize said relay responsive to overload current in said auxiliary branch circuit and to open said contact means, and means connecting said ignition branch circuit and headlight branch circuit in parallel to said battery responsive to energization of the relay, said diode being polarized to prevent flow of current from the battery to the auxiliary branch circuit when the relay is energized, the relay latching to maintain said ignition branch circuit and headlight branch circuit connected in parallel to the battery until it is manually released.

References Cited by the Examiner

UNITED STATES PATENTS

| | | | |
|---|---|---|---|
| 2,125,990 | 8/1938 | Catron | 315—91 |
| 2,503,632 | 4/1950 | Prather | 315—91 |
| 2,581,338 | 1/1952 | La Roza | 307—10 |
| 2,774,842 | 12/1956 | Shrader | 307—10 |

ORIS L. RADER, *Primary Examiner.*

T. J. MADDEN, *Assistant Examiner.*